United States Patent [19]

Song

[11] Patent Number: 5,737,550
[45] Date of Patent: Apr. 7, 1998

[54] CACHE MEMORY TO PROCESSOR BUS INTERFACE AND METHOD THEREOF

[75] Inventor: Seungtaik Michael Song, Austin, Tex.

[73] Assignee: Advanced Micro Devices, Inc., Sunnyvale, Calif.

[21] Appl. No.: 412,471

[22] Filed: Mar. 28, 1995

[51] Int. Cl.$^6$ .................................................. G06F 13/14
[52] U.S. Cl. ...................... 395/310; 711/119; 711/137; 395/872
[58] Field of Search ...................... 395/307, 308, 395/309, 310, 250, 872, 448, 445, 447, 449, 470, 471, 473; 711/118, 122, 137, 119

[56] References Cited

U.S. PATENT DOCUMENTS

| | | | |
|---|---|---|---|
| 3,781,808 | 12/1973 | Ahearn et al. | 340/172.5 |
| 4,044,338 | 8/1977 | Wolf | 364/900 |
| 4,155,119 | 5/1979 | DeWard et al. | 364/200 |
| 4,179,737 | 12/1979 | Kim | 364/200 |
| 4,384,343 | 5/1983 | Morganti et al. | 364/900 |
| 4,453,212 | 6/1984 | Gaither et al. | 364/200 |
| 4,502,111 | 2/1985 | Riffe et al. | 364/200 |
| 4,736,288 | 4/1988 | Shintani et al. | 364/200 |
| 4,807,115 | 2/1989 | Torng | 364/200 |
| 4,858,105 | 8/1989 | Kuriyama et al. | 364/200 |
| 4,912,630 | 3/1990 | Cochcroft, Jr. | 395/421.01 |
| 4,926,322 | 5/1990 | Stimac et al. | 364/200 |

(List continued on next page.)

FOREIGN PATENT DOCUMENTS

| | | |
|---|---|---|
| 0140533 | 5/1985 | European Pat. Off. . |
| 0170525 | 2/1986 | European Pat. Off. . |
| 0259095 | 3/1988 | European Pat. Off. . |
| 0380854 | 8/1990 | European Pat. Off. . |
| 0454984 | 11/1991 | European Pat. Off. . |
| 0454985 | 11/1991 | European Pat. Off. . |
| 0459232 | 12/1991 | European Pat. Off. . |
| 0498654 | 8/1992 | European Pat. Off. . |
| 0506972 | 10/1992 | European Pat. Off. . |
| 43 35 475 A1 | 6/1994 | Germany . |
| 2260429 | 4/1993 | United Kingdom . |
| 2263985 | 8/1993 | United Kingdom . |
| 2263987 | 8/1993 | United Kingdom . |
| 2281422 | 3/1995 | United Kingdom . |
| 92/22035 | 12/1992 | WIPO . |
| 93/20507 | 10/1993 | WIPO . |

OTHER PUBLICATIONS

Mike Johnson, "Superscalar Microprocessor Design", (Prentice Hall series in innovative technology), 1991.

IBM Technical Disclosure Bulletin, "System/370 Emulator Assist Processor for a Reduced Instruction Set Computer", vol. 30, No. 10, pp. 308–309, Mar. 1988.

(List continued on next page.)

*Primary Examiner*—Eddie P. Chan
*Assistant Examiner*—Hiep T. Nguyen
*Attorney, Agent, or Firm*—Skjerven, Morrill, MacPherson, Franklin & Friel, L.L.P.; Andrew C. Graham

[57] ABSTRACT

A bus interface unit of a processor system provides an efficient interface between a cache memory, optimized to receive a particular number of bytes per request, and an external bus optimized to provide a different number of bytes per bus transaction. In one embodiment a cache memory requests a memory block of 16-bytes, and in response the bus interface unit executes a bus transaction to instead retrieve 32 bytes from an external memory source. The requested 16 bytes are provided to the cache memory, and the remaining 16 bytes are buffered, along with the starting address of the buffered bytes, by the bus interface unit. A subsequent request from the cache memory for a memory block matching the buffered bytes is handled directly by the bus interface unit, without initiating any external bus transaction. The cache memory need not be aware that the external bus transfers 32 bytes per transaction, rather than the requested 16 bytes. Since the bus interface unit uses physical addresses, the details of cache organization actually used and of any paging schemes are irrelevant. Moreover, little overhead is required and no tight communication with the processor is necessary.

24 Claims, 8 Drawing Sheets

U.S. PATENT DOCUMENTS

| | | | |
|---|---|---|---|
| 5,056,006 | 10/1991 | Acharya et al. | 395/425 |
| 5,109,498 | 4/1992 | Kamiya et al. | 395/450 |
| 5,119,485 | 6/1992 | Ledbetter, Jr. et al. | 395/473 |
| 5,129,067 | 7/1992 | Johnson | 395/375 |
| 5,136,697 | 8/1992 | Johnson | 395/375 |
| 5,185,868 | 2/1993 | Tran | 395/375 |
| 5,226,126 | 7/1993 | McFarland et al. | 395/375 |
| 5,226,130 | 7/1993 | Favor et al. | 395/375 |
| 5,228,134 | 7/1993 | MacWilliams | 395/465 |
| 5,233,694 | 8/1993 | Hotta et al. | 395/375 |
| 5,233,696 | 8/1993 | Suzuki | 395/375 |
| 5,261,066 | 11/1993 | Jouppi et al. | 395/449 |
| 5,301,296 | 4/1994 | Mohri et al. | 395/445 |
| 5,337,415 | 8/1994 | DeLano et al. | 395/375 |
| 5,367,660 | 11/1994 | Gat et al. | 395/450 |

OTHER PUBLICATIONS

Toyohiko Yoshida, et al, "The Approach to Multiple Instruction Execution in the GMICRO/400 Processor", ©1991, pp. 185–195.

Robert B.K. Dewar, et al., "Microprocessors a Programmer's View", ©1990, Chapter 4, pp. 103–134.

David A. Patterson, et al., "Computer Architecture an Quantitive Approach", ©1990, Chapter 8, pp. 403–497.

U.S. Patent Application Serial No. 08/233,567 filed Apr. 26, 1994 entitled "Dependency Checking and Forwarding of Variable Width Operands" –Gerald D. Zuraski, Jr., et al., Attorney Docket No. M–2284 US.

Brian Case, "AMD Unviels First Superscaler 29K Core", Microprocessor Report, vol. 8, No. 14, Oct. 24, 1994, pp. 23–26.

Gurindar S. Sohi, "Instruction Issue Logic for High–Performance, Interruptible, Multiply Functional Unit, Pipelined Computers", IEEE Transaction on Computers, vol. 39, No. 3, ©1990, pp. 349–359.

Brandt, et al, IBM Technical Disclosure Bulletin, "High Speed Buffer with Dual Directories", vol. 26, No. 12, May 1984, pp. 6264–6265.

Shreekant S. Thakkar and William E. Hostmann, "An Instruction Pitch Unit for a Graph Reduction Machine", IEEE ©1986, pp. 82–91.

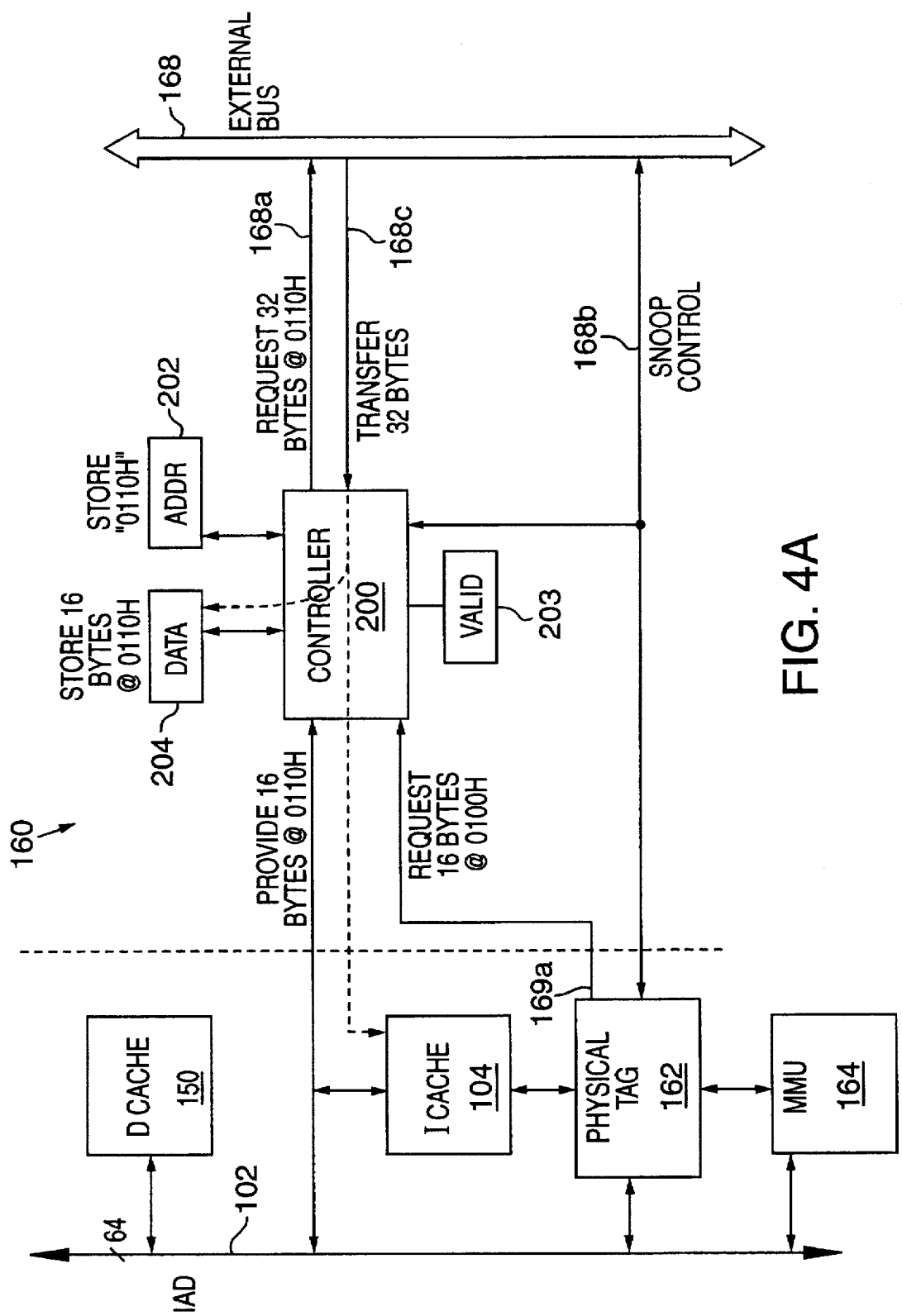

CACHE MEMORY TO PROCESSOR BUS INTERFACE AND METHOD THEREOF

CROSS-REFERENCE TO RELATED PATENT APPLICATIONS

This patent application is related to the copending U.S. patent application Ser. No. 08/146,381, entitled "Linearly Addressable Microprocessor Cache" by David B. Witt (Attorney Docket No. M-2412 US), filed Oct. 29, 1993, the disclosure of which is incorporated herein by reference.

This patent application is related to the copending U.S. patent application Ser. No. 08/145,905, entitled "Pre-Decoded Instruction Cache And Method Therefor Particularly Suitable For Variable Byte-Length Instructions" by David B. Witt and Michael D. Goddard (Attorney Docket No. M-2278 US), filed Oct. 29, 1993, the disclosure of which is incorporated herein by reference.

This patent application is related to the copending U.S. patent application Ser. No. 08/146,376, entitled "High Performance Load/Store Functional Unit And Data Cache" by William M. Johnson, David B. Witt and Murali Chinnakonda (Attorney Docket No. M-2281 US), filed Oct. 10, 1993, the disclosure of which is incorporated herein by reference.

BACKGROUND OF THE INVENTION

The present invention relates to processor cache memories, and more particularly, to the interface between such a cache memory and a processor bus.

Microprocessors have attained wide-spread use throughout many industries. A goal of any microprocessor is to process information quickly. One technique to increase the speed with which the microprocessor processes information is to provide the microprocessor with an architecture which includes a fast local memory called a cache.

A cache is used by the microprocessor to temporarily store instructions and data. A cache which stores both instructions and data is referred to as a unified cache; a cache which stores only instructions is an instruction cache and a cache which stores only data is a data cache. Providing a microprocessor architecture with either a unified cache or an instruction cache and a data cache is a matter of design choice.

One microprocessor architecture that has gained widespread acceptance is the X86 architecture. This architecture is the basic architecture of the i386™ microprocessor, the i486™ microprocessor, and the Pentium™ processor, all available from the Intel Corporation of Santa Clara, Calif. The X86 architecture provides for three distinct types of addresses, a logical address, a linear address (i.e., virtual), and a physical address.

The logical address represents an offset from a segment base address. The segment base address is accessed via a selector. More specifically, the selector, which is stored in a segment register, is an index which points to a location in a global descriptor table (GDT). The GDT location stores the linear address corresponding to the segment base address.

The translation between logical and linear addresses depends on whether the microprocessor is in Real Mode or Protected Mode. When the microprocessor is in Real Mode, then a segmentation unit shifts the selector left four bits and adds the result to the offset to form the linear address. When the microprocessor is in Protected Mode, then the segmentation unit adds the linear base address pointed to by the selector to the offset to provide the linear address.

The physical address is the address which appears on the address pins of the microprocessor bus and is used to physically address external memory. The physical address does not necessarily correspond to the linear address. If paging is not enabled then the 32-bit linear address corresponds to the physical address. If paging is enabled, then the linear address must be translated into the physical address. A paging unit, which is usually included as part of the microprocessor's memory management unit, performs this translation. Nonetheless, no matter whether paging is enabled or not, the address which appears on the address pins of the microprocessor bus, and which is used to address all memory external to the microprocessor, is always the physical address.

The paging unit uses two levels of tables to translate the linear address into a physical address. The first level table is a Page Directory and the second level table is a Page Table. The Page Directory includes a plurality of page directory entries; each entry includes the address of a Page Table and information about the Page Table. The upper 10 bits of the linear address (A22–A31) are used as an index to select a Page Directory Entry. The Page Table includes a plurality of Page Table entries; each Page Table entry includes a starting address of a page frame and statistical information about the page. Address bits A12–A21 of the linear address are used as an index to select one of the Page Table entries. The starting address of the page frame is concatenated with the lower 12 bits of the linear address to form the physical address.

Because accessing two levels of table for every memory operation substantially affects performance of the microprocessor, the memory management unit generally also includes a cache of the most recently accessed page table entries, this cache is called a translation lookaside buffer (TLB). The microprocessor only uses the paging unit when an entry is not in the TLB.

The first processor conforming to the X86 architecture which included a cache was the 486 processor, which included an 8 Kbyte unified cache accessed via physical addresses; however, the functional units of this processor (as in all X86 processors) operate with logical addresses. Accordingly, when the functional units require access to the cache, the logical address must be converted to a linear address and then to a physical address.

The Pentium™ processor utilizes separate instruction and data caches, which are also physically addressed. The instruction cache (I-cache) is an 8K two-way set-associative cache using a 32-byte line size. A dedicated ITLB (Instruction Table-Lookaside-Buffer) allows the instruction cache to be physically tagged. The array containing these physical tags are triple-ported: one port is for bus snooping (for supporting cache coherency between multiple processors) while the other two are used for a split fetch capability, which gives the processor the ability to fetch a contiguous block of instruction bytes when the block straddles the boundary between two half-cache lines.

When a referenced instruction byte is not found in the instruction cache (a cache miss), a new line is allocated, tags are written thereinto, and a cache "line fill" operation is initiated to pre-fetch the entire group of 32 bytes within which the referenced instruction byte resides. This group of 32 bytes is read from external memory, using a bus interface unit of the processor, and forwarded to the instruction cache in order to fill the newly-allocated line of the cache memory. Since instruction references tend to be sequential in nature, additional cache line fills may be initiated by the cache to load additional sequential instruction bytes into the cache, anticipating a sequential memory reference by the processor.

In order to efficiently bring an entire cache line into the processor, the Pentium™ processor uses a burst bus cycle, transferring 64 bits of data on each of 4 consecutive bus clock cycles. Thus, the entire cache line of 32 bytes may be transferred in a single coordinated bus transaction (a single bus operation request with a corresponding set of data transfers in response). The 32-byte cache line size and the 64-bit data bus size of the Pentium™ processor, combine to suggest the efficiency of such a bus transaction.

In the Pentium™ processor both the instruction and data caches are organized using a 32-byte cache line size. Consequently, the cache line fill bus transaction described above is used for both the instruction and the data caches. Having defined such a cycle, however, the organization of the caches seems almost rigidly fixed at a 32-byte line size. Certainly any processor compatible with the Pentium™ processor must support the burst bus cycle described above. Nonetheless, other cache organizations may be desirable, including a line size other than 32-bytes. For example, if a smaller 16-byte line size is used, the cache may preferably request a block of 16 bytes (because only one cache line will necessarily have been allocated at a time). If the same 32-byte bus transaction is used, the excess 16 bytes not requested by the cache memory would be wasted if simply discarded. In such a case, pre-fetching these extra 16 bytes contributes to a wasteful utilization of the processor bus and leads to additional bus cycles, each with an associated delay, to provide a memory block to the cache.

SUMMARY OF THE INVENTION

It has been discovered that a bus interface unit of a processor system provides an advantageous interface between a cache memory, optimized to receive a particular number of bytes per request, and an external bus optimized to provide a different number of bytes per transaction.

In a method embodiment, the present invention relates to a method for providing bytes retrieved from a memory source to a first cache memory, wherein the first cache memory is adapted to receive a plurality "N" of bytes per request, and wherein the memory source is accessed using a processor bus which is adapted to transfer a plurality "M" of bytes per processor bus transaction, wherein "M" is greater than "N". The method includes receiving a request from the first cache memory to retrieve a plurality "N" of bytes associated with a first requested address, followed by comparing the first requested address with a buffered address associated with a buffered plurality "N" of bytes from a previous processor bus transaction. The method continues by providing the buffered plurality "N" of bytes to the first cache memory if the first requested address matches the buffered address, and by executing a processor bus transaction to retrieve a plurality "M" of bytes associated with the first requested address from the memory source if the first requested address does not match the buffered address. The method then concludes by providing, subsequent to the executing step, a portion of the retrieved plurality "M" of bytes associated with the first requested address to the first cache memory, wherein the portion comprises a plurality "N" of bytes associated with the first requested address, and by buffering a remaining portion of the retrieved plurality "M" of bytes, and an address associated therewith.

In an apparatus embodiment, the present invention relates to a bus interface circuit in a processor system for interfacing a first cache memory to a processor bus, wherein the first cache memory is adapted to receive a plurality "N" of bytes per request, and wherein the processor bus is adapted to transfer, for first cache memory operations, a plurality "M" of bytes per processor bus transaction, wherein "M" is greater than "N". The bus interface circuit includes a controller circuit coupled to the processor bus for initiating a processor bus transaction and for retrieving a plurality "M" of bytes transferred thereby, and a cache interface circuit coupled to the controller circuit for receiving a requested address from the first cache memory and for receiving a request from the first cache memory to provide a plurality "N" of bytes associated with the requested address. The bus interface circuit also includes a first buffer circuit coupled to the controller circuit for buffering a plurality "M-N" of bytes, being a portion of the plurality "M" of bytes retrieved from the processor bus, further includes a second buffer circuit coupled to the controller circuit for buffering an address associated with the buffered plurality "M-N" of bytes, and still further includes a comparator circuit for comparing the requested address to the buffered address stored within the second buffer circuit.

Because of the independence of a bus interface unit, the present invention advantageously affords the independent optimization of the cache memory without undo hinderance of predefined bus transaction requirements. For example, in one embodiment a cache memory may blissfully request a 16-byte transfer for a cache line fill operation, and the bus interface unit may appear to the cache memory to dutifully provide the 16-byte block. The cache memory may remain totally unaware that the external bus definition "requires" that cache lines be filled in groups of 32 bytes.

Further, since the bus interface unit uses physical addresses, the details of cache organization actually used and the details of paging schemes are irrelevant. Unlike a cache memory itself, there is little overhead required and no tight communication with the processor is necessary. The interface here may be totally contained within a bus interface unit.

BRIEF DESCRIPTION OF THE DRAWINGS

FIG. 4A is a block diagram of a bus interface unit in accordance with the current invention, and which illustrates an example of a first request from the instruction cache.

DETAILED DESCRIPTION OF THE INVENTION

The following sets forth a detailed description of the best contemplated mode for carrying out the invention. The description is intended to be illustrative of the invention and should not be taken to be limiting.

Figure 1:
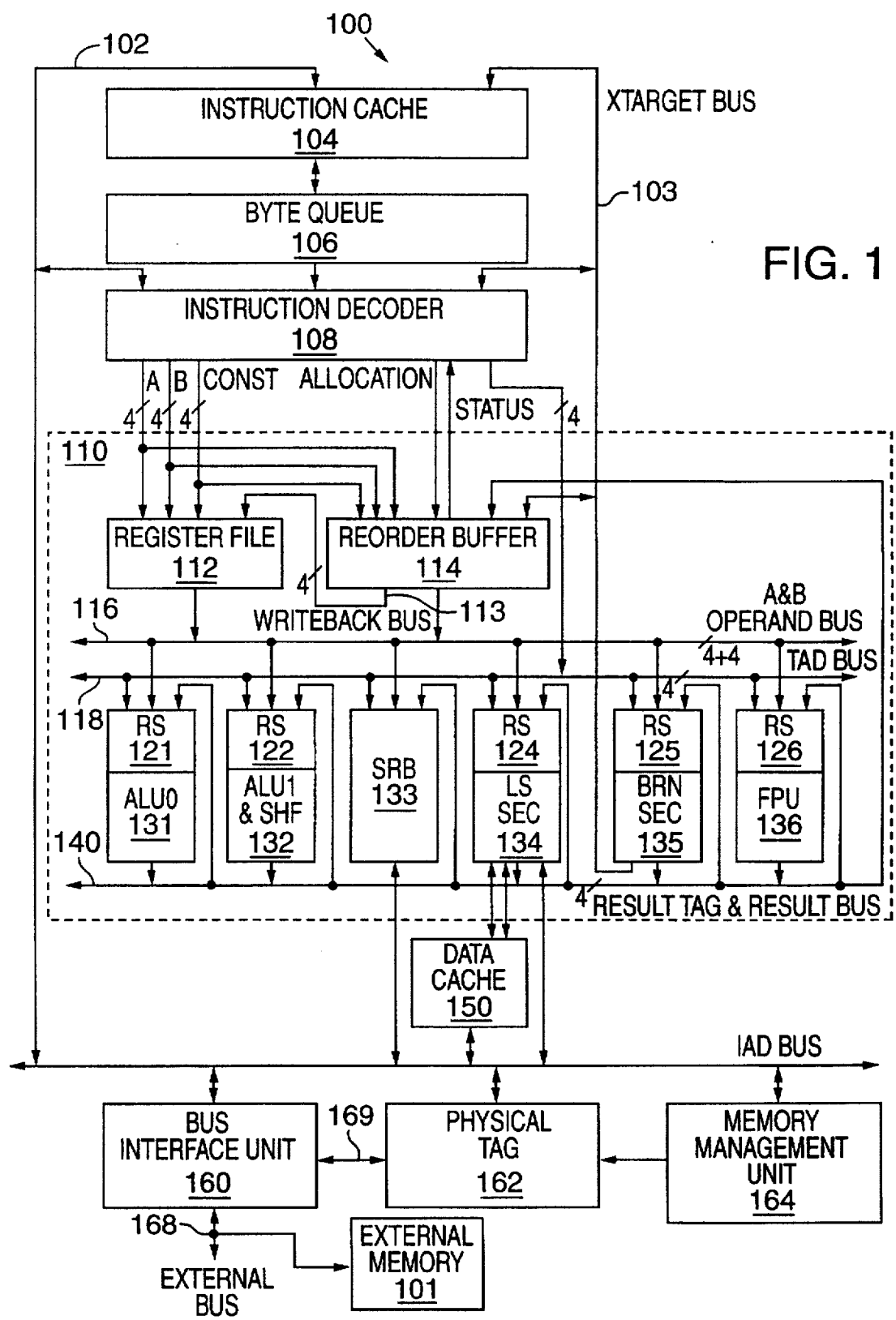
FIG. 1 is a block diagram of a microprocessor in accordance with the present invention.

FIG. 1 illustrates a superscalar X86 microprocessor 100 which executes the X86 instruction set. A description of such a superscalar processor with reference to the present invention is presented; copending application entitled "Linearly Addressable Microprocessor Cache", which is incorporated by reference, sets forth the structure and operation of the processor caches in greater detail.

Microprocessor 100 is coupled to physically addressed external memory 101 via a processor bus, in this case an external bus 168, such as a Pentium™-compatible bus or other conventional microprocessor bus. Microprocessor 100 includes instruction cache 104 which is coupled to internal address and data (IAD) bus 102 and XTARGET bus 103 as well as to byte queue 106 which is coupled to instruction decoder 108. Instruction decoder 108 is coupled to RISC core 110. RISC core 110 includes register file 112 and reorder buffer 114 as well as a variety of functional units such as arithmetic logic unit 131 (ALU0), arithmetic logic and shift unit 132 (ALU1 & SHF), special register block 133 (SRB), load/store functional unit 134 (LSSEC), branch section 135 (BRNSEC), and floating point unit 136 (FPU).

RISC core 110 includes A and B operand buses 116, type and dispatch (TAD) bus 118 and result tag and result bus 140 which are coupled to the functional units. A and B operand buses 116 are also coupled to register file 112 and reorder buffer 114. TAD bus 118 is also coupled to instruction decoder 108. Result bus 140 is also coupled to reorder buffer 114. Additionally, branch section 135 is coupled to reorder buffer 114, instruction decoder 108 and instruction cache 104 via XTARGET bus 103.

In addition to instruction cache 104, microprocessor 100 also includes data cache 150 (DCACHE) and physical tag circuit 162. Data cache 150 is coupled to Load/store functional unit 134 of the RISC core and with IAD bus 102. Physical tag circuit 162 interacts with both instruction cache 104 and data cache 150 via IAD bus 102. Instruction cache 104 and data cache 150 are both linearly addressable caches. Instruction cache 104 and data cache 150 are physically separate, however, both caches are organized using the same architecture, i.e., both caches include a store array along with a corresponding tag array.

Microprocessor 100 also includes memory management unit (MMU) 164 and bus interface unit 160 (BIU). Memory management unit 164 is coupled with IAD bus 102 and physical tag circuit 162. Bus interface unit 160 is coupled to physical tag circuit 162 via a bus 169 and IAD bus 102 as well as to the external bus 168.

Figure 2:
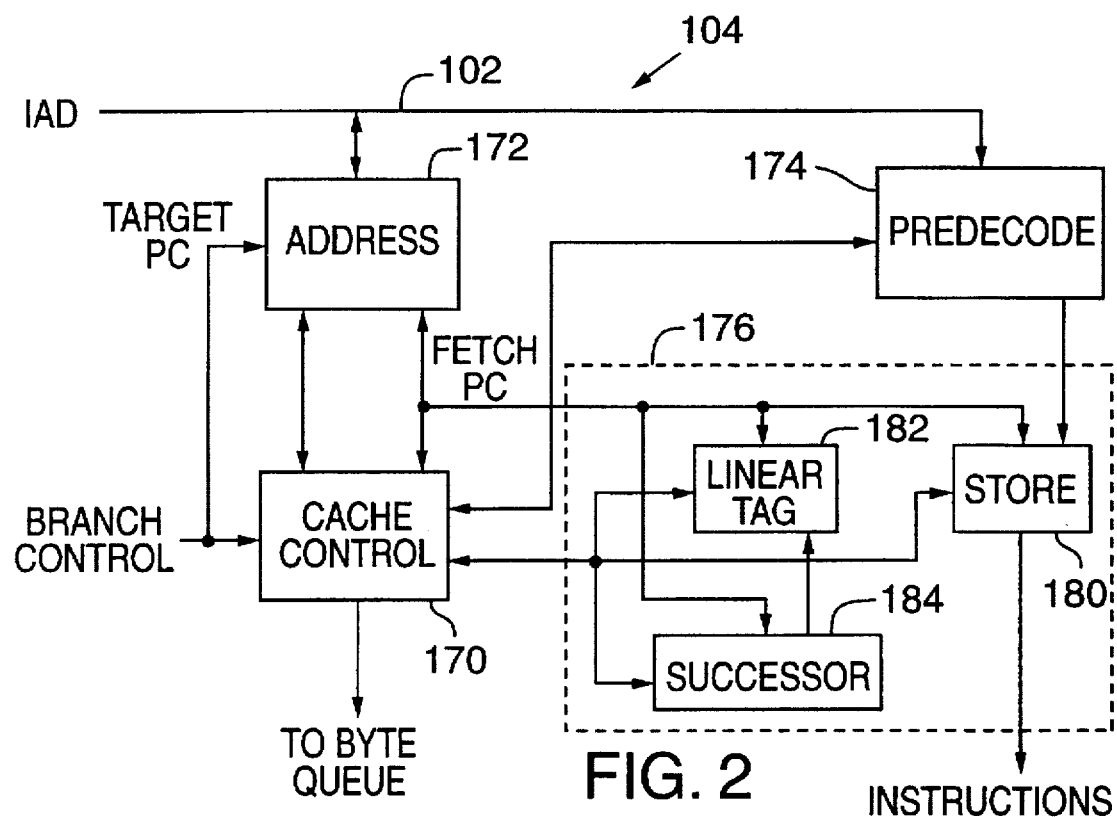
FIG. 2 is a block diagram of the FIG. 1 linearly-addressed instruction cache.

Referring to FIG. 2, a description of instruction cache 104 with reference to the present invention is presented; co-pending application entitled "Pre-Decoded Instruction Cache and Method Therefor Particularly Suitable for Variable Byte-Length Instructions", which is incorporated by reference, sets forth the structure and operation of instruction cache 104 in greater detail. Instruction cache 104 is a linearly addressed 16 Kbyte 4-way set-associative cache. Each set includes 256 entries (cache "lines"); each entry includes a sixteen-byte instruction block, a linear address tag and next predicted executed branch information. Instruction cache 104 includes cache controller 170, address circuit 172, predecode circuit 174 and cache array 176. Cache controller 170 provides control signals to orchestrate the various operations of instruction cache 104. Address circuit 172 generates a linear fetch program counter (FETCH PC) based upon a logical target program counter which is received from branch section 135; address circuit 172 also provides address generation and X86 protection checking associated with pre-fetching instructions from external memory. Address circuit 172 functions as a translation circuit for translating between logical addresses and linear addresses. Predecode circuit 174 receives pre-fetched x86 instruction bytes via IAD bus 102, assigns predecode bits for each x86 instruction byte and writes the predecoded x86 instruction bytes into cache array 176. Cache array 176 stores instructions received from predecode circuit 174 and provides these instructions to byte queue 106 when addressed by the linear FETCH PC signal.

Cache array 176 is organized into three main arrays, instruction cache store array 180, linear tag array and successor array 184. Instruction cache store array 180 stores the 16 bytes of instructions for each cache line. Linear tag array 182 stores the linear address tags corresponding to each cache line. Successor array 184 stores predicted branch information, which is used to support branch prediction, corresponding to each cache line. Each of these arrays is addressed by the linear FETCH PC address which is provided by address circuit 172.

By sizing the entries (i.e., the line size) of the instruction cache 104 at 16 bytes each, twice as many entries are available, for a given size cache, compared to a 32-byte entry size. Since each entry within instruction cache 104 also contains an address tag, a larger number of entries results in a higher hit rate for the instruction cache, thus improving processor performance. Further, since each entry supports up to one predicted branch instruction therein, a larger number of entries also affords a larger number of predicted branch instructions contained within the instruction cache at any given time.

Figure 3:
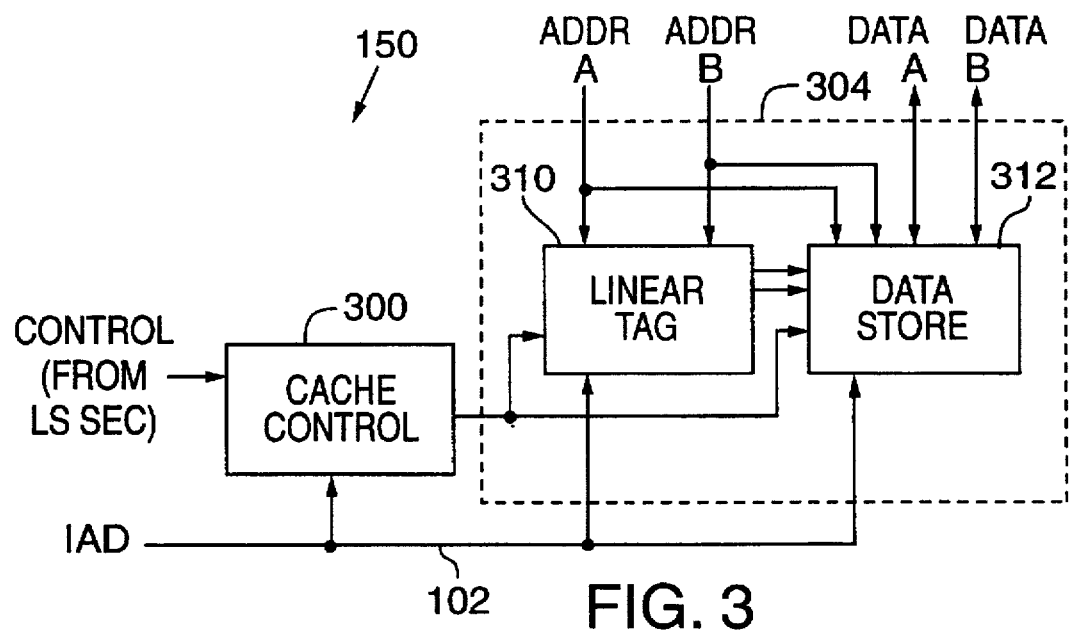
FIG. 3 is a block diagram of the FIG. 1 linearly-addressed data cache.

Referring to FIG. 3, a description of data cache 150 with reference to the present invention is presented; copending application entitled "HighPerformance Load/Store Functional Unit and Data Cache", which is incorporated by reference, sets forth the structure and operation of data cache 150 in greater detail. Data cache 150 is a linearly addressed 8 Kbyte 4-way set-associative cache. Each set of data cache 150 includes 128 entries; each entry includes a sixteen byte block of information. Data cache 150 includes data cache controller 300 and data cache array 304. Data cache controller 300 provides control signals to orchestrate the various operations of data cache 104. Data cache controller 300 receives control signals (CONTROL) from load store section 134 as well as from IAD bus 102; data cache controller 300 provides control signals to cache array 304. Cache array 304 stores data in blocks and provides the blocks of data when a particular block is addressed. Data cache array 304 is also coupled with IAD bus 102; in addition to the control signals from cache controller 300, data cache array receives address signals and data signals from load store section 134.

As described above, the instruction cache 104 and the data cache 150 are each independently optimized to maximize performance of the processor 100. While both utilize linear addresses, the instruction cache 104 is organized using a 16-byte line size in order to maximize the cache hit rate and to improve the branch prediction efficiency. Conversely, the data cache 150 is organized using a 32-byte line size. Nonetheless, cache line fill operations for both caches must interface to the same external bus, which for a Pentium™-compatible bus uses a burst read cycle and transfers 32 bytes per cache line fill bus transaction.

Referring again to FIG. 1, the bus interface unit 160 provides an advantageous capability to interface each independently-optimized cache to the same burst read cycle. All requests for cache line fills must pass to the bus interface unit, and must provide a physical address corresponding to the memory locations to be retrieved. Even though the cache arrays themselves are both accessed using linear addresses, the memory management unit 164 and the physical tags circuit 162 together translate the linear address which the cache requests to a corresponding physical address. Physical tags circuit 162 provides a linkage from this physical address back to the linear address, and provide the physical address to the bus interface unit 160 via bus 169, where it is driven onto the external bus 168 and thus to the external memory 101.

A portion of the bus interface unit 160 in accordance with the present invention is shown in FIG. 4A. Controller 200 is coupled to the external bus 168 for initiating a burst read cycle and for receiving the 32 bytes from the external memory 101. An instruction cache miss causes a physical address to be generated by the memory management unit 164 acting together with the physical tags circuit 162. For illustration purposes, assume that the physical address generated for this request is 0100H (hexadecimal), as is shown in FIG. 4A. (for ease of discussion, the full 32-bit address of 0000 0100H is abbreviated to 0100H). A request to pre-fetch a cache line of 16 bytes starting at physical address 0100H (within external memory 101) is communicated from the physical tags circuit 162 to the bus interface unit 160 via a bus 169a. Within a portion of the bus interface unit 160, this request is received by a controller 200. However, because the external bus 168 is defined to require 32-byte burst read cycles for cache line fill operations, the controller 200 instead initiates a bus transaction to retrieve (or pre-fetch) 32 bytes starting at physical address 0100H, which is communicated to external bus 168 via bus 168A. As discussed above, such a transaction provides a 32-bit physical address to the external bus 168, and four transfers of 64-bits each (i.e., 8-bytes each) are strobed on successive bus clock cycles to transfer the 32 bytes from the external bus 168 into the bus interface unit 160. The controller 200 receives these 32 bytes from external bus 168 shortly thereafter via bus 168C, and provides the originally requested 16 bytes starting at address 0100H to the instruction cache 104 via the IAD bus 102 using, for example, two 64-bit transfers. Rather than discarding the other 16 bytes not originally requested (those bytes starting at physical address 0110H) the controller 200 stores these 16 bytes (of the 32 bytes) into a buffer 204 along with the starting address of these bytes (0110H) into a buffer 202. The controller 200 also then asserts an indicator bit in valid block 203 to "mark" the contents of buffers 202 and 204 as valid.

Figure 4B:
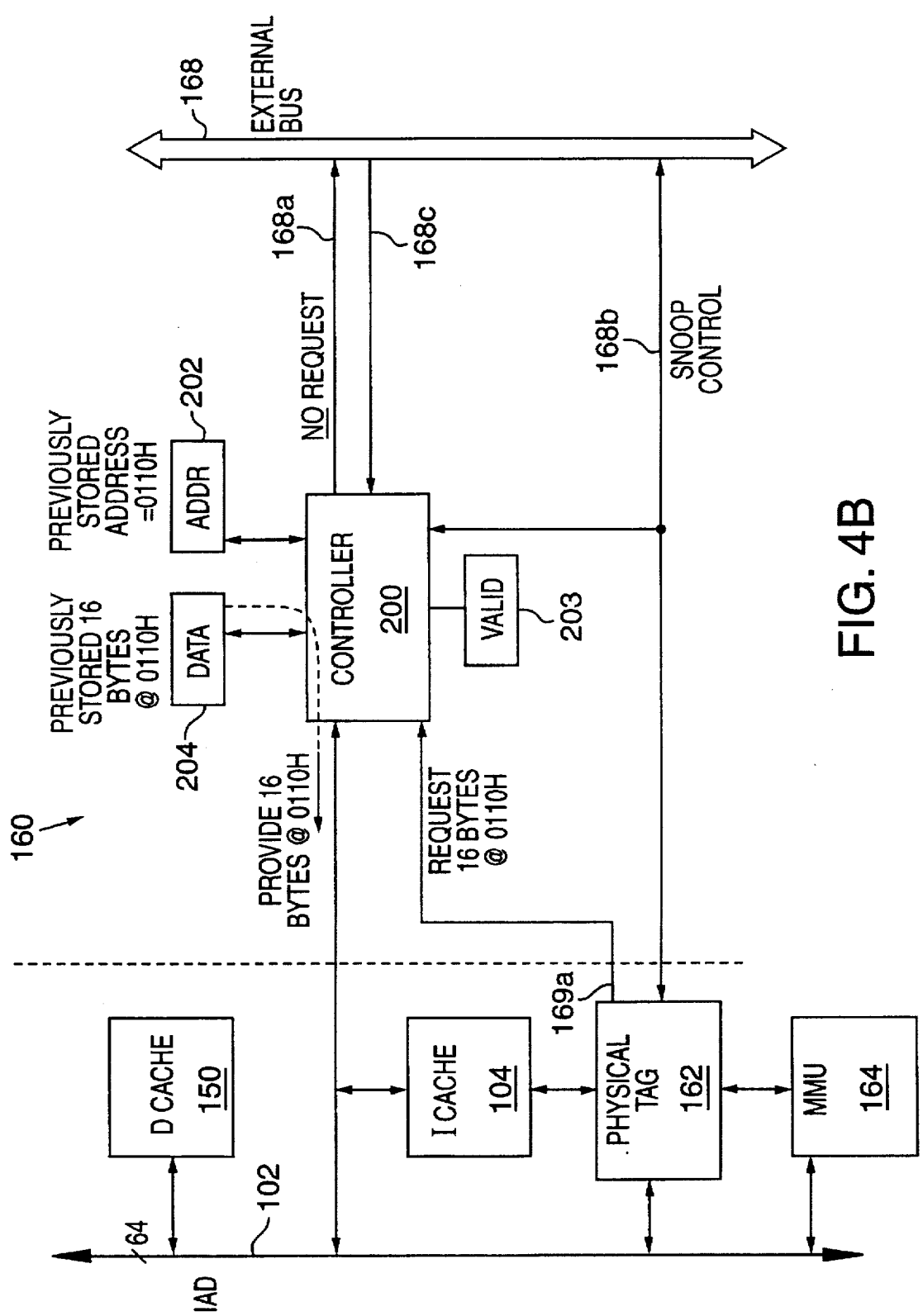
FIG. 4B is a block diagram of the bus interface unit of FIG. 4A, and which illustrates an example of a subsequent request from the instruction cache.

When the instruction cache 104 next encounters a cache miss, a request to pre-fetch a cache line of 16 bytes will again be generated. Since code references tend to be localized, a high likelihood exists that such a subsequent pre-fetch request will specify a sequential address block compared to the previous address used. Continuing with the example above, such a sequential address block would have a physical address of 0110H (which is sixteen more than 0100H), and is illustrated in FIG. 4B. As before, this address is communicated from the physical tags circuit 162 to the bus interface unit 160 via bus 169a. When received by controller 200, the requested address is compared with the address stored in buffer 202 from a previous bus transaction and the indicator bit in valid block 203 is checked to determine if the buffers 202 and 204 are still valid. Since there is a match and the buffers are valid, no external bus cycle is necessary as the requested bytes have already been retrieved, and the external memory request is suppressed. Instead, the controller 200 retrieves the 16 bytes previously stored within buffer 204, and provides these to the instruction cache 104 via the IAD bus 102, as shown.

Alternatively, when the instruction cache 104 next encounters a cache miss, a request to pre-fetch a cache line residing somewhere else in physical memory may be generated, for example, residing at 0670H (not shown). After all, the bus interface unit 160 has no way of knowing what physical address the next instruction cache pre-fetch request will specify. When such a request is received by the controller 200, the requested address (e.g., 0670H)is compared with the address stored in buffer 202 from a previous bus transaction (e.g., 0110H). Since for this alternative there is no match, an external bus cycle is necessary and the controller 200 initiates a bus transaction to pre-fetch 32 bytes starting at physical address 0660H (being quad double-word aligned). The controller 200 receives these 32 bytes from external bus 168 shortly thereafter via bus 168C, and provides the requested 16 bytes starting at address 0670H to the instruction cache 104 via the IAD bus 102. As before, the controller 200 stores the 16 non-requested bytes into buffer 204, thus overwriting the previously stored but unused bytes from the previous bus transaction. The controller 200 also stores the address of these newly-retrieved bytes (0660H) into buffer 202, as discussed above, which also overwrites the previous address (0110H) stored therein, and again asserts the indicator bit in valid block 203.

If a bus transaction were to be generated for each cache line fill request from the instruction cache 104, additional external bus cycles would be required. By using a 32-byte transfer and buffering the non-requested 16 bytes, fewer external bus cycles are necessary to support the instruction cache 104. This reduces external bus traffic, which is particularly helpful in multiprocessor systems and in other systems, such as those using DMA channels, where I/O traffic may lead to bus congestion.

Moreover, instruction bytes are returned, on average, to the instruction cache 104 much more quickly. For example, if the requested bytes for a cache line fill are already in the buffer 204, the 16 bytes are provided to the instruction cache 104 within 3 clock cycles (for the above processor 100 embodiment). In contrast, if the 16 bytes are not within the buffer 204 and an external bus transaction is required, a minimum of 7 clock cycles are required, assuming no wait states in the external memory 101 and a 1X processor clock (compared to the bus clock). More significantly, 14 clock cycles are required for a processor clock running at 2X the bus clock, and 21 clock cycles are required for a clock-tripled (3X) processor.

While providing a suitable interface between the instruction cache 104 and the external bus 168 affords the advantages recited above, several other situations must be dealt with other than instruction cache requests as described above.

For example, in any system with multiple caches it is vitally important to maintain coherency between the various caches. Such a situation occurs between an instruction cache and a data cache located within the same processor, and also occurs between caches maintained by separate processors in a multi-processor system. A similar concern arises anywhere a "copy" of certain information is maintained in a system, when that information is subject to being changed by another activity. In the bus interface controller of FIGS. 4A–4B, a concern arises because any instruction bytes stored within buffer 204 are potentially subject to change by the processor 100 itself (through a data write instruction into instruction address space within external memory 101), or by another processor writing into that same instruction address space.

Figure 4C:
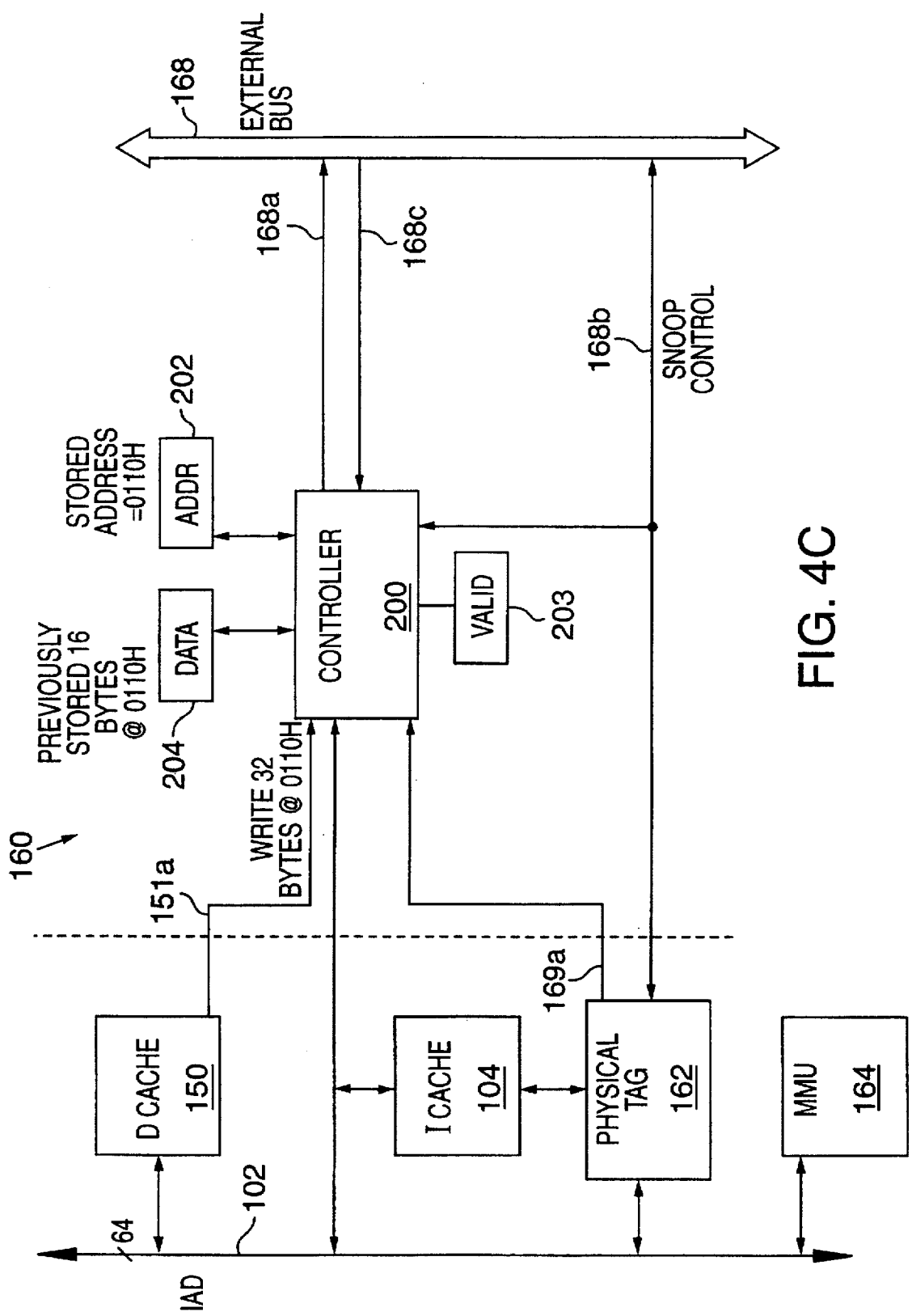
FIG. 4C is a block diagram of the bus interface unit of FIG. 4A, and which illustrates an example of a request from the data cache.

For example, a data cache writeback operation (a write to external memory 101) may try to write to an external memory location having data previously retrieved by the controller 200 and stored within buffer 204, but not yet requested by the instruction cache 104. If the instruction cache 104 subsequently requests a block which includes this memory location, the controller 200 must not respond to the request by providing the instruction bytes stored within buffer 204, as these instruction bytes no longer correctly reflect external memory 101. Consequently, the controller 200 also reacts to data cache 150 operations involving external memory, as well. For data read operations, no action is necessarily required, for any previously buffered instruction bytes within buffer 204 are just as valid after the data read operation as before. However, for a data write operation, as shown in FIG. 4C, the controller 200 may compare the data write address conveyed on bus 151A to the address stored within buffer 202. If the data write address matches (as is shown), then the buffers 202 and 204 must then be invalidated (for example, by clearing the indicator bit within valid block 203). The caches themselves also detect this condition as well and deal accordingly, as is discussed in the co-pending application entitled "Linearly Accessed Microprocessor Cache" already referenced. But since the bus interface unit 160 is totally independent of the cache organization and other details, the controller 200 must also invalidate the buffers 202 and 204 (for this example, as shown). This validation/invalidation may also be accomplished by an indicator bit within the controller 200, by an indicator bit stored within the buffer 202 along with the address stored therein, by an indicator bit stored within the buffer 204 along with the instruction bytes stored therein, or by any number of other equally suitable ways.

Alternatively, in an abundance of caution, the controller may invalidate the buffers 202 and 204 upon any read or write request from the data cache, thus ensuring no deleterious effect on cache coherency whatsoever, and of course, simplifying the design of the bus interface controller 160.

Bus watching from the external bus 168 is accomplished by first accessing the physical tags circuit 62 via bus 168b. By using the physical tags stored therein, the functional units of the processor 100 may continue accessing the caches during bus activity even though instruction cache 104 and data cache 150 do not include separate ports for bus watching.

A bus watching, i.e., snooping, operation is initiated when bus interface unit 160 determines that the external bus 168 is owned by another master (not shown) and a read or write indication is received by bus interface unit 160 via bus 168b. The physical address carried over the external bus 168 is provided to physical tags circuit 162 to determine whether a match of any of the entries occurs. If no match occurs, during either a bus watching read or a bus watching write, then the snoop operation is completed and processor 100 does not participate in the bus watching operation.

If a hit occurs, then a copy of the physical address being snooped is held by processor 100 and a hit indication is immediately issued to the device which owns the external bus. This hit indication is in any conventional state that the multiprocessing snooping protocol accepts (e.g., the MESI protocol). The cache, either data cache 150 or instruction cache 104, that corresponds to this hit is then halted and inspected.

For simplicity sake, whenever a bus-watching write operation is initiated (which involves a write operation by another processor), the controller 200 preferably invalidates the buffer 204, rather than perform any comparison with the address stored within buffer 202. The system performance penalty of very occasionally having to re-retrieve the 16 bytes "lost" is minimal, the additional complexity within the bus interface unit 160 is minimal, and the absolute assurance of coherency is easily achieved (that is, as to any negative effects due to the bus interface unit 160). Alternatively, for a bus watching read operation, no action by the bus interface unit 160 is necessarily required. Nonetheless, just as in the data cache discussion above, the controller 200 may simply invalidate the buffers 202 and 204 to simplify the bus interface unit and to ensure cache coherency. The potential participation of the physical tag circuit 162 and both the data cache 150 and the instruction cache 104 in a bus watching operation, as described above and as more fully described in the co-pending application entitled "Linearly Addressable Microprocessor Cache", nonetheless proceeds independently of the bus interface unit 160 actions just described and bears the major burden of cache coherency.

For some additional increase in complexity, however, one could alternatively choose to perform an address comparison during a bus watching write cycle and conditionally invalidate the buffers 202 and 204 upon a match.

Figure 5:
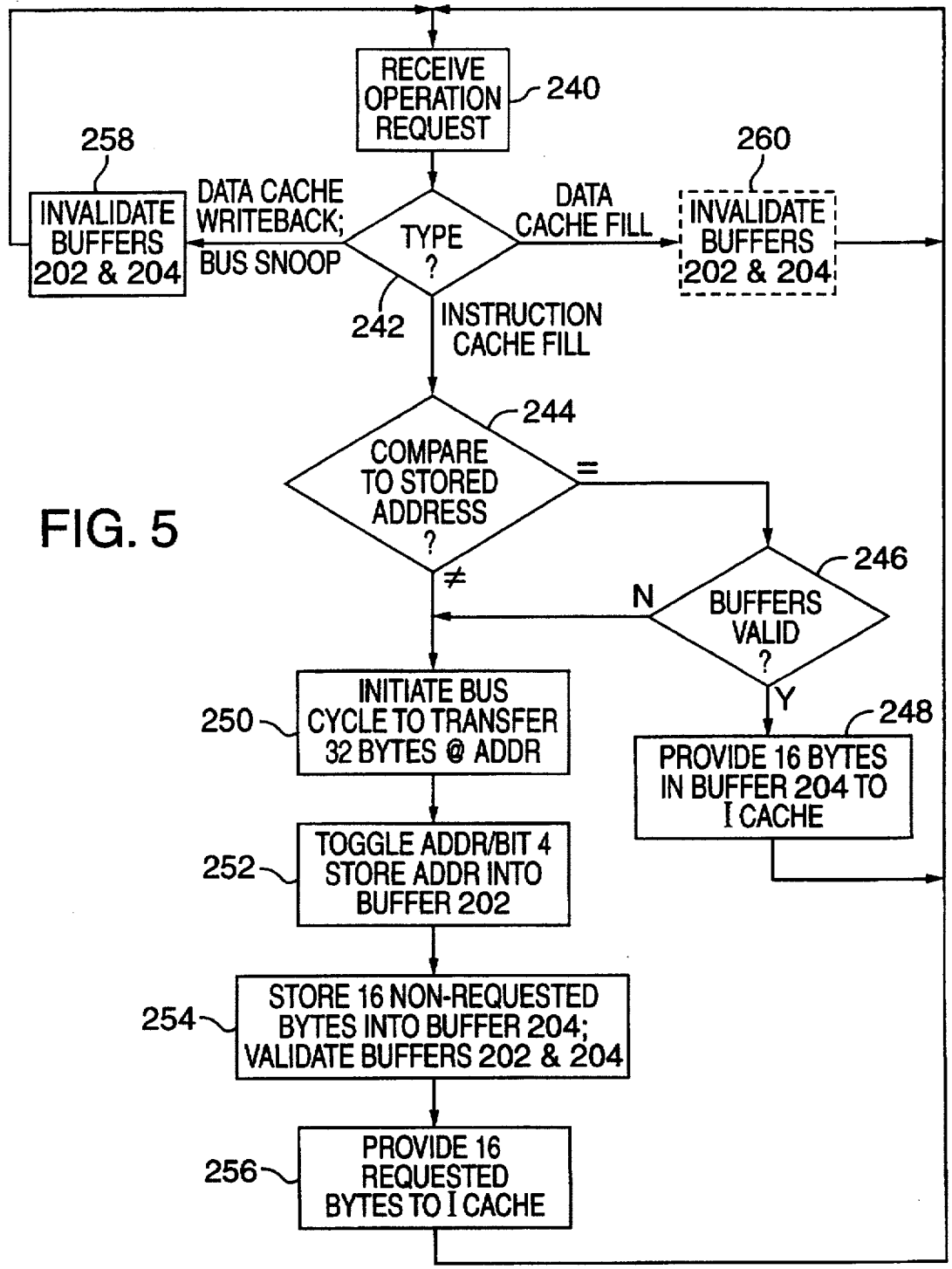
FIG. 5 is a flow chart of one embodiment of the operation of the FIGS. 4A–4C bus interface unit, in accordance with the present invention.

FIG. 5 illustrates one embodiment of a flowchart describing a suitable operation of the bus interface unit 160 as described in FIGS. 4A–4C. An operation request is received at step 240, and is tested at step 242. If a request for a data cache writeback, or a bus snoop request, control proceeds to step 258, which invalidates the buffers 202 and 204. Control then returns to step 240 to wait for the next request. If the request is for a data cache line fill, control passes to optional step 260, which also invalidates the buffers 202 and 204, and returns as well to step 240. However, if the request is for an instruction cache line fill, control proceeds to step 244. If the requested address matches the buffered address stored within buffer 202, and if the buffers 202 and 204 are valid, control proceeds to step 248. The sixteen requested instruction bytes, which are already stored within buffer 204, are then provided to the instruction cache 104, and control returned to step 240. Alternatively, if the requested address does not match the address stored within buffer 202, or if the buffers 202 and 204 are not valid, control passes to step 250, which initiates a bus transaction to retrieve a group of thirty-two bytes from external memory 101. The address for this group of thirty-two bytes is preferably formed by forcing to zero the lower-order five bits A[4:0] of the requested address, thus aligning the requested group of sixteen bytes within a thirty-two byte block. At step 252 an address is formed by toggling bit A4 of the requested address so that the newly formed address reflects the non-requested group of sixteen bytes. This newly-formed address is then stored within buffer 202. At step 254 the non-requested group of sixteen bytes are themselves stored within buffer 204, and the valid indicator 203 is asserted, marking buffers 202 and 204 as logically valid. Finally, at step 256, the requested sixteen bytes are provided to the instruction cache, and control passed back to step 240. Obviously, these steps may be practiced in various orders, and FIG. 5 reflects only one of many specific sequences which may be utilized. Certain of these steps may also be advantageously performed in parallel with other steps.

Figure 6:
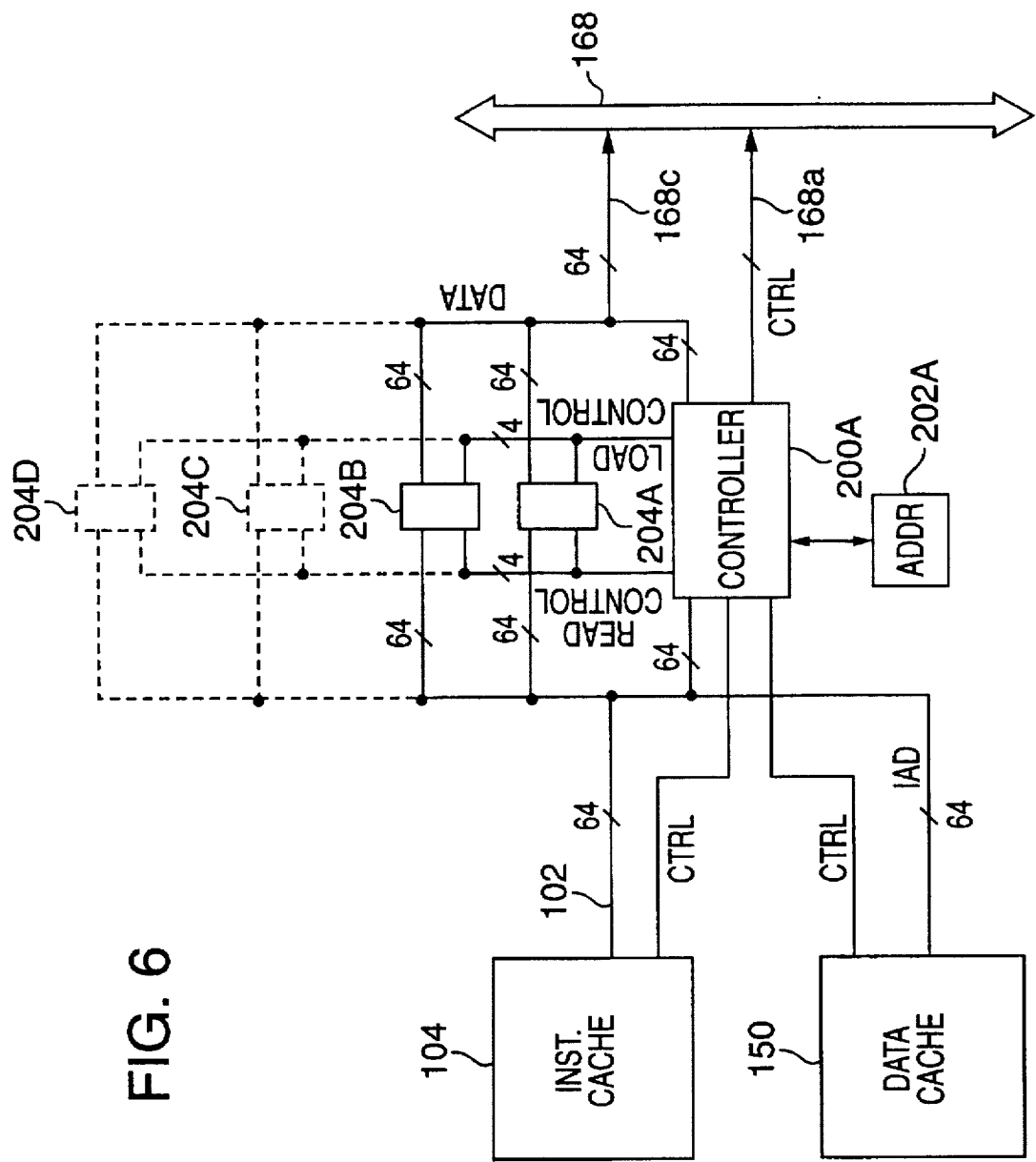
FIG. 6 is a partial block diagram of one embodiment of a bus interface unit in accordance with the present invention.

FIG. 6 illustrates "data-flow" portions of an embodiment particularly suitable for an X86 environment, where the instruction cache line size is 16 bytes, and where the bus transaction for cache line fills retrieves 32 bytes using four consecutive eight-byte transfers via a 64-bit bus. The first 64-bit transfer (the first eight instruction bytes) are passed from bus 168 through 64-bit buffer 204A, and pass to the instruction cache 104 via IAD bus 102. Similarly, the second 64-bit transfer (the next eight instruction bytes) is passed from bus 168 through 64-bit buffer 204B, and passes to the instruction cache 104 via IAD bus 102 in a second IAD bus 102 transfer. The third and fourth 64-bit transfers, however, are stored into buffers 204A and 204B, respectively, while the corresponding address of these buffered sixteen bytes is formed by controller 200A and stored into buffer 202A. Upon a subsequent instruction cache request, if the address stored within buffer 202A matches the requested address, then no external bus transaction is initiated. Rather, the two 64-bit transfers corresponding to the requested address are passed directly from buffers 204A and 204B using two IAD bus 102 transfers.

Alternatively, four buffers may be used to decouple the timing of the burst read cycles on external bus 168 from the internal IAD bus 102 cycles. Optional 64-bit buffers 204C and 204D may also be used, together with buffers 204A and 204B, to provide temporary buffer space for all four burst read cycles occurring on bus 168. The buffered instruction bytes may then be transferred to the instruction cache 104 in two groups of two 64-bit transfers.

Figure 7:
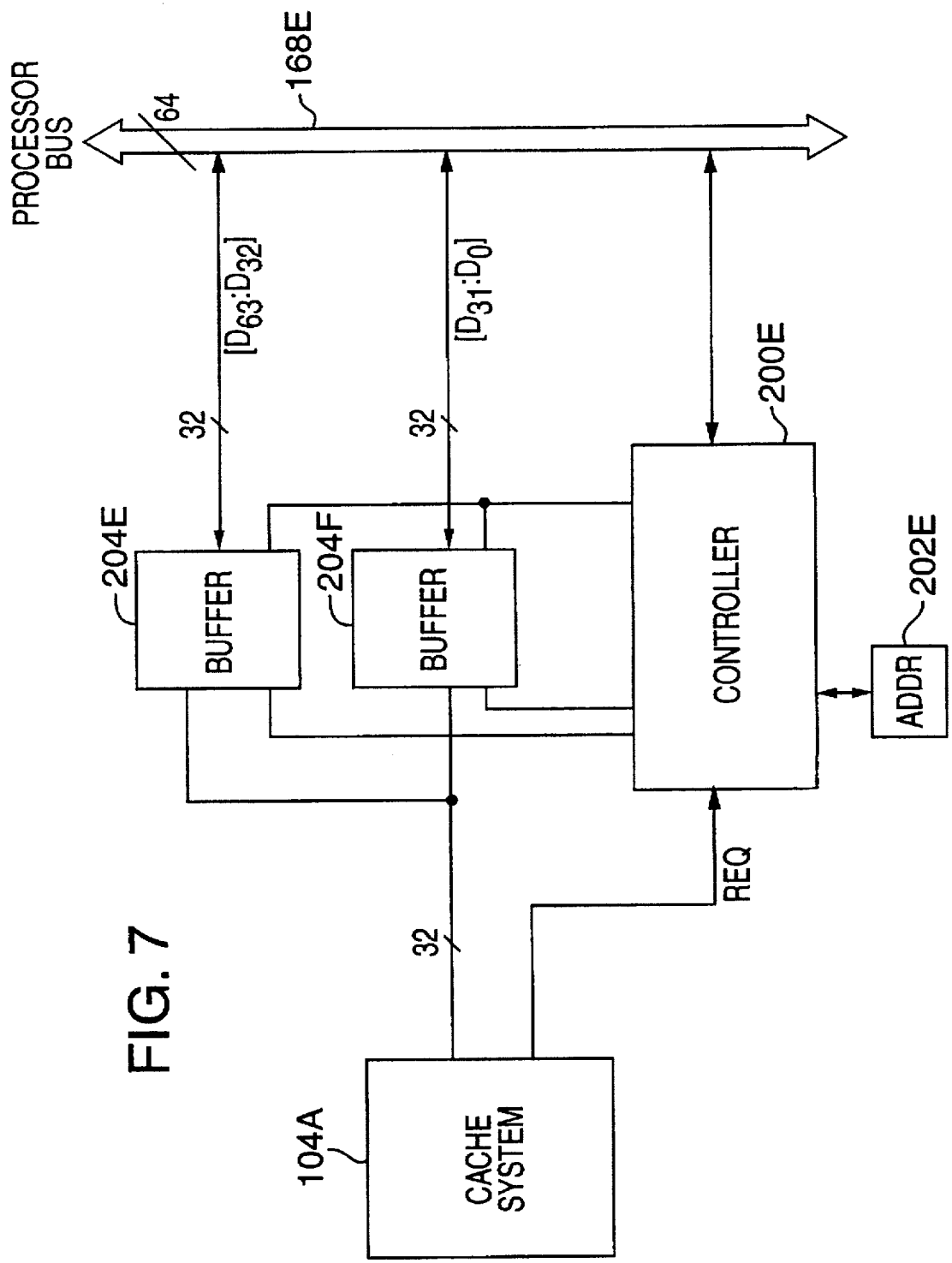
FIG. 7 is a partial block diagram of another embodiment of a bus interface unit in accordance with the present invention.

The present invention's advantages are not limited to usage within a processor utilizing burst read cycles for cache line fills. FIG. 7 illustrates yet another embodiment of a bus interface unit in accordance with the current invention. Upon an instruction cache request for a 32-bit pre-fetch, a single bus read cycle on 64-bit external bus 168E retrieves bits D[63:32] which are stored into 32-bit buffer 204E, and bits D[31:0] which are stored into 32-bit buffer 204F. The requested 32 bits (four bytes) are provided to the instruction cache 104A, while the address of the remaining 32-bits is formed by controller 200E and stored within buffer 202E. These remaining 32-bits are then available for a subsequent instruction cache pre-fetch request without need for an additional external bus cycle.

There are many advantages to interfacing the instruction cache 104 to the external bus 168 using the bus interface unit 160 as described above. Most importantly, the independence of the bus interface unit 160 affords the ability to optimize the instruction cache 104 without hinderance of the 32-byte transfer requirements of the processor bus. The instruction cache 104 blissfully requests 16-byte cache line fill operations, and the bus interface unit 160 appears to the instruction cache to dutifully provide the 16 bytes. The instruction cache 104 may be totally unaware that the external bus definition "requires" that cache line fills be performed in groups of 32 bytes.

Since the bus interface unit 160, and more particularly, the controller 200 uses physical addresses, the details of cache organization actually used (e.g., logical, linear, or physical addresses) and the details of paging schemes, are irrelevant. For example, there is no need to "participate" when a page directory or TLB is updated. Moreover, unlike a cache memory itself, there is no overhead of dirty bits, coherency protocol bits, cache hit/cache miss indications, and the like. No tight communication with the processor is required, as in a cache. The interface here may be totally contained within a bus interface unit and remains extremely independent of cache organizational details.

While a specific embodiment has been described above, other variations may be practiced that fall within the scope of this invention. For example, the 16-byte buffer 202 described above provides space to store a portion of one 32-byte bus transaction. Additional buffers may be provided to hold all or portions of a group of bytes from several previously accessed bus transactions. Although described primarily in the context of an instruction cache, the present invention need not be limited to usage with instruction caches.

While particular embodiments of the present invention have been shown and described, modifications may be made, and it is therefore intended to cover in the appended claims all such changes and modifications which fall within the true spirit and scope of the invention.

What is claimed is:

1. In a processor, a bus interface circuit for interfacing a first cache memory of said processor and a second cache memory of said processor to an external processor bus, wherein the first cache memory has a line size of "N" bytes and is adapted to receive a plurality "N" of bytes per request, wherein the second cache memory has a line size of "M" bytes and is adapted to receive a plurality "M" of bytes per request, and wherein the processor bus is adapted to transfer a plurality "M" of bytes per processor bus transaction, wherein "M" is an integer multiple of "N", said interface circuit comprising:

a controller circuit coupled to the processor bus for initiating a processor bus transaction and for retrieving a plurality "M" of bytes transferred thereby, said processor bus adapted to transfer a plurality "M" of bytes per processor bus transaction;

a first cache interface circuit coupled to the controller circuit for receiving from the first cache memory a request to provide a plurality "N" of bytes associated with a first requested address, for conveying the first request to the controller circuit, and for providing to the first cache memory a corresponding plurality "N" of bytes retrieved from the processor bus by the controller circuit, said plurality "N" of bytes being a portion of the plurality "M" of bytes retrieved from the processor bus in the bus transaction;

a second cache interface circuit coupled to the controller circuit for receiving from the second cache memory a request to provide a plurality "M" of bytes associated with a second requested address, wherein "M" is an integer multiple of "N", for conveying the second request to the controller circuit, and for providing to the second cache memory a corresponding plurality "M" of bytes retrieved from the processor bus by the controller circuit;

wherein the first cache memory interface circuit includes
a first buffer circuit coupled to the controller circuit for buffering a plurality "M-N" of bytes, being a portion of the plurality "M" of bytes retrieved from the processor bus;
a second buffer circuit coupled to the controller circuit for buffering an address associated with the buffered plurality "M-N" of bytes; and
a comparator circuit for comparing a requested address to an address stored within the second buffer circuit.

2. A bus interface circuit as in claim 1 wherein the first cache memory interface circuit includes an indicator circuit for indicating the validity of the buffered plurality "M-N" of bytes and the buffered address associated therewith.

3. A bus interface circuit as in claim 2 further comprising means for invalidating, upon receiving a request from the second cache memory, any previously stored buffered plurality "M-N" of bytes and the buffered address associated therewith.

4. A bus interface circuit as in claim 1 wherein the processor bus transaction comprises a burst read cycle including four consecutive eight-byte transfers.

5. A bus interface circuit as in claim 1 wherein the processor bus transaction comprises a burst read cycle including a plurality of eight-byte transfers.

6. A bus interface circuit as in claim 4 wherein "N" is equal to decimal 16 and "M" is equal to decimal 32.

7. A bus interface circuit as in claim 4 wherein the processor comprises an X86 processor.

8. A method of interfacing a first cache memory and a second cache memory within a processor to an external processor bus which is adapted to transfer a plurality "M" of bytes per processor bus transaction, wherein the first cache memory has a line size of "N" bytes and is adapted to receive a plurality "N" of bytes per prefetch request, wherein the second cache memory has a line size of "M" bytes and is adapted to receive a plurality "M" of bytes per prefetch request, and wherein an external memory is accessed through the external processor bus, wherein "M" is an integer multiple of "N", said method comprising the steps of:

receiving a first request from either the first cache memory or the second cache memory to retrieve from the external memory a respective plurality "N" or "M" of bytes associated with a first requested address;

executing a processor bus transaction to retrieve from the external memory a first plurality "M" of bytes associated with the first requested address;

if the first request is from the second cache memory, then providing the first retrieved plurality "M" of bytes associated with the first requested address to the second cache memory;

if the first request is from the first cache memory, then providing a portion of the first retrieved plurality "M" of bytes associated with the first requested address to the first cache memory, wherein the portion comprises a plurality "N" of bytes associated with the first requested address; and storing a remaining portion of the first retrieved plurality "M" of bytes, and an address associated therewith, into a buffer;

receiving a second request from either the first cache memory or the second cache memory to retrieve from the external memory a respective plurality "N" or "M" of bytes associated with a second requested address;

if the second request is from the second cache memory, then executing a processor bus transaction to retrieve from the external memory a second plurality "M" of bytes associated with the second requested address, and providing the second retrieved plurality "M" of bytes to the second cache memory;

if the second request is from the first cache memory, then comparing the second requested address with the previously stored address associated with the previously stored remaining portion of the first retrieved plurality "M" of bytes;

if the second requested address matches the previously stored address, then providing a plurality "N" of bytes from the previously stored plurality of bytes to the first cache memory; and if the second requested address does not match the previously stored address, executing a processor bus transaction to retrieve from the external memory a third plurality "M" of bytes associated with the second requested address, then providing to the first cache memory a portion of the third retrieved plurality "M" of bytes comprising a plurality "N" of bytes associated with the second requested address, and storing a remaining portion of the third retrieved plurality "M" of bytes, and an address associated therewith, into the buffer.

9. A method as in claim 8 further comprising the steps of:

if the second request is from the second cache memory, then comparing the second requested address with the previously stored address associated with the previously stored remaining portion of the first retrieved plurality "M" of bytes; and invalidating the previously stored first plurality of bytes and the previously stored address associated therewith if the second requested address matches the previously stored address, to prevent future usage thereof.

10. A method as in claim 8 further comprising the steps of:

if the second request is from the second cache memory, then invalidating the previously stored remaining portion of the first retrieved plurality "M" of bytes, and the previously stored address associated therewith, to prevent future usage thereof.

11. A method as in claim 8 further comprising the steps of:

receiving a request from an external device for a bus watching operation associated with a third requested address;

comparing the third requested address with the previously stored address associated with the previously stored remaining portion of the first retrieved plurality "M" of bytes; and if the third requested address matches the previously stored address, invalidating the previously stored remaining portion of the first retrieved plurality "M" of bytes and the previously stored address associated therewith to prevent future usage thereof.

12. A method as in claim 8 further comprising the steps of:

receiving a request from an external device for a bus watching operation associated with a third requested address; and invalidating the previously stored remaining portion of the first retrieved plurality "M" of bytes, and the previously stored address associated therewith, to prevent future usage thereof.

13. A method as in claim 12 wherein the bus watching operation comprises an operation chosen from the group consisting of a read operation, a write operation, and a cache inquire operation.

14. A method as in claim 8 wherein the processor comprises an X86 processor.

15. A method as in claim 14 wherein "M" is equal to decimal 32 and wherein the processor bus transaction comprises a burst read cycle consisting of four consecutive eight-byte transfers.

16. A method as in claim 14 wherein "M" is equal to decimal 16 and wherein the processor bus transaction comprises a burst read cycle consisting of four consecutive four-byte transfers.

17. A method as in claim 14 wherein the processor bus transaction comprises a burst read cycle including a plurality of consecutive sixty-four bit transfers.

18. A method as in claim 14 wherein the processor bus transaction comprises a single read cycle retrieving a plurality "M" of bytes.

19. A method as in claim 15 wherein the recited steps are accomplished within a bus interface unit of the processor.

20. A method as in claim 19 wherein the first cache memory comprises an instruction cache memory and wherein the second cache memory comprises a data cache memory.

21. A method as in claim 19 wherein the first cache memory comprises a data cache memory and wherein the second cache memory comprises an instruction cache memory.

22. A method as in claim 8 wherein an address associated with a particular plurality of bytes comprises a starting address of a block of the external memory containing the particular plurality of bytes.

23. A method as in claim 8 wherein an address associated with a particular plurality of bytes comprises an address other than a starting address of a block of the external memory containing the particular plurality of bytes.

24. In an X86 processor system, a circuit for interfacing a first cache memory and a second cache memory within an integrated circuit processor to an external processor bus which is adapted to transfer a plurality "M" of bytes per processor bus transaction, wherein the first cache memory has a line size of "N" bytes and is adapted to receive a plurality "N" of bytes per prefetch request, wherein the second cache memory has a line size of "M" bytes and is adapted to receive a plurality "M" of bytes per prefetch request, and wherein an external memory is accessed through the external processor bus, wherein "M" is an integer multiple of "N", said circuit comprising:

means for receiving a first request from either the first cache memory or the second cache memory to retrieve from the external memory a respective plurality "N" or "M" of bytes associated with a first requested address;

means for executing a processor bus transaction to retrieve from the external memory a first plurality "M" of bytes associated with the first requested address;

means for providing the first retrieved plurality "M" of bytes associated with the first requested address to the second cache memory if the first request is from the second cache memory;

means for providing a portion of the first retrieved plurality "M" of bytes associated with the first requested address to the first cache memory, wherein the portion comprises a plurality "N" of bytes associated with the first requested address, if the first request is from the first cache memory, and for storing a remaining portion of the first retrieved plurality "M" of bytes, and an address associated therewith, into a buffer;

means for receiving a second request from either the first cache memory or the second cache memory to retrieve from the external memory a respective plurality "N" or "M" of bytes associated with a second requested address;

means for executing a processor bus transaction to retrieve from the external memory a second plurality "M" of bytes associated with the second requested address, if the second request is from the second cache memory, and for providing the second retrieved plurality "M" of bytes to the second cache memory;

means for comparing the second requested address with the previously stored address associated with the previously stored plurality of bytes, if the second request is from the fist cache memory, and for providing a plurality "N" of bytes from the previously stored plurality of bytes to the first cache memory if the second requested address matches the previously stored address; and means for executing a processor bus transaction to retrieve from the external memory a third plurality "M" of bytes associated with the second requested address, if the second requested address does not match the previously stored address, for providing to the first cache memory a portion of the third retrieved plurality "M" of bytes comprising a plurality "N" of bytes associated with the second requested address, and for storing a remaining portion of the third retrieved plurality "M" of bytes, and an address associated therewith, into the buffer.

* * * * *